United States Patent Office 2,849,472
Patented Aug. 26, 1958

2,849,472

METHOD OF PREPARING ALKYNYL TRICHLOROSILANES

Arthur N. Pines, Snyder, and George H. Wagner, Clarence, N. Y., assignors to Union Carbide Corporation, a corporation of New York No Drawing. Application June 28, 1954
Serial No. 439,892

2 Claims. (Cl. 260—448.2)

This invention relates to new silicon containing compounds and to a process for preparing same. More particularly, the invention relates to new silicon containing compounds comprising alkynyl trichlorosilanes having the general formula $$RC\equiv C-SiCl_3$$

where R is a monovalent alkyl radical such as methyl, ethyl, propyl, isopropyl, butyl and the like.

The new compositions of matter of the present invention may be prepared by a process which comprises dehydrochlorinating alpha-chloroalkenyl trichlorosilanes having the general formula

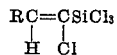

where R is monovalent alkyl radical such as methyl, ethyl, propyl, isopropyl, butyl and the like. Dehydrochlorination is accomplished by treating an alpha-chloroalkenyl trichlorosilane with small amounts of isoquinoline or of the hydrochloride salt of isoquinoline at a temperature of from about 160° C. to about 250° C. The amount of isoquinoline or of the isoquinoline hydrochloride employed may vary about ten per cent to about fifty per cent by weight of the alpha-chloroalkenyl trichlorosilane and preferably will vary in an amount by weight from about twenty-five percent to about forty percent.

One method for preparing the new compounds of the invention involves charging an alpha-chloroalkenyl trichlorosilane, such as 1-chloro-1-propenyl trichlorosilane, and an appropriate amount of isoquinoline or of isoquinoline hydrochloride to a flask connected to a distilling column and heating the mixture to a temperature within the range referred to above. Hydrogen chloride gas is evolved from the reaction mixture, passes through the column and may be vented to a hood or recovered as a valuable product of the reaction. Heating is continued until the evolution of hydrogen chloride ceases. After heating, there remains in the flask, for the specific instance referred to, a mixture comprising 1-propynyl-trichlorosilane and unreacted 1-chloro-1-propenyl trichlorosilane together with small amounts of isoquinoline and isoquinoline hydrochloride. The 1-propynyl trichlorosilane may then be readily separated from the reaction mixture by fractional distillation.

The preferred method of preparing the alkynyl trichlorosilanes of this invention comprises dehydrochlorinating alpha-chloroalkenyl trichlorosilanes with isoquinoline or isoquinoline hydrochloride at a temperature of from about 160° C. to about 250° C. under reflux conditions and providing for the removal of the products of the reaction, namely hydrogen chloride and an alkynyl trichlorosilane, in a single operation. This is permissible as such products are gaseous at the reflux temperature of the reaction mixture. In the practice of this embodiment of the invention the reaction may be conducted by heating the reflux, a mixture of an alpha-chloroalkenyl trichlorosilane, such as 1-chloro-1-propenyl trichlorosilane and an appropriate amount of isoquinoline or isoquinoline hydrochloride in a flask connected to a distilling column provided with a still head and receiver. Hydrogen chloride and 1-propynyl trichlorosilane are evolved from the reaction mixture and pass to the still head where the hydrogen chloride product is vented to a hood and the gaseous 1-propynyl trichlorosilane product is condensed and passed to a receiver. If desired only a portion of the 1-propynyl trichlorosilane product obtained at the still head may be passed to the receiver with the remaining portion returned to the column. By conducting the reaction in this manner the process may be made continuous by providing means for the controlled addition of the alpha-chloroalkenyl trichlorosilane to the reaction mixture at a rate equal to that at which the products are collected. In this manner small amounts of isoquinoline or of isoquinoline hydrochloride may be employed to dehydrochlorinate large quantities of an alpha-chloroalkenyl trichlorosilane.

The following example is illustrative of the invention.

Example 1

To a round bottom flask connected to a distilling column packed 12 inches of its length with ⅛ inch glass helices and equipped with a still head and receiver were charged 88 grams of 1-chloro-1-propenyl trichlorosilane and 24 grams of isoquinoline. The mixture was heated to reflux (flask temperature 172° C.–240°C.). Shortly after reflux conditions were obtained the gaseous products of the reaction passed to the still head with the hydrogen chloride product vented to a hood and only a portion of the condensed 1-propynyl trichlorosilane collected in the receiver with the remaining portion returned to the column. Heating was continued until the evolution of hydrogen chloride ceased. There was about 3.2 grams of a product boiling at a temperature of 134° C. at 750 mm. Hg. This product was identified by infra-red analysis as 1-propynyl trichlorosilane. The material had a density of 1.31 grams per cc. at 25° C.

The process of this invention is only applicable to the dehydrochlorination of alpha-chloroalkenyl trichlorosilanes which contain at least three carbon atoms in the chloroalkenyl group with an olefinic linkage in the one position relative to the silicon atom and which contained a single chlorine atom bonded to the alpha carbon atom of said group. Attempts to employ this process to the dehydrochlorination of alpha-chlorovinyl trichlorosilane and beta-chlorovinyl trichlorosilane have not proven successful.

The new compositions of matter of the invention are useful as starting materials in the synthesis of various silicon containing derivatives. For example, under appropriate conditions they may be reacted with compounds capable of adding across the acetylenic triple bond to produce many saturated compounds or unsaturated compounds containing an olefinic linkage. Specifically, hydrogen may be added across the triple bond to partially or completely saturate the compounds.

A further use of those alkynyl trichlorosilanes disclosed and claimed herein lies in the preparation of various silicon containing copolymers. Thus, with the aid of the well-known addition polymerization type catalysts, such as benzoyl peroxide, copolymers of the alkynyl trichlorosilanes and vinyl containing organic compounds such as butadiene, styrine, vinyl acetate, vinyl chloride and the like, may be readily prepared.

What is claimed is:

1. A process of dehydrochlorinating chloroalkenyl trichlorosilane having the formula

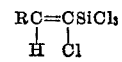

where R is an alkyl radical which comprises heating said trichlorosilane with from about ten percent to about fifty percent by weight of the trichlorosilane of compounds taken from the group consisting of isoquinoline and isoquinoline hydrochloride at a temperature of from about 160° C. to 250° C. to evolve hydrogen chloride from the reaction zone.

2. A process of dehydrochlorinating 1-chloro-1-propenyl trichlorosilane which comprises heating said trichlorosilane with from about twenty percent to about forty percent by weight of said trichlorosilane of isoquinoline at a temperature of from about 160° C. to about 250° C. under reflux conditions and removing hydrogen chloride and 1-propynyl trichlorosilane from the reaction zone.

References Cited in the file of this patent

UNITED STATES PATENTS 2,671,101    Frisch et al. _____ Mar. 2, 1954

OTHER REFERENCES

Volnov et al.: "Jour. Gen. Chem." (USSR), vol. 10, pp. 1600–1604 (1940).

Agre et al.: "Jour. Am. Chem. Soc.," vol. 74 (1952), pp. 3899–3902.

Frisch et al.: "Jour. Am. Chem. Soc.," vol. 74 (1952), pp. 4853–4855.